Oct. 30, 1956 W. F. BRAKHAGE 2,768,730
LOADING DEVICE
Filed Sept. 8, 1953 4 Sheets-Sheet 1

INVENTOR.
William F. Brakhage.
BY
Fishburn & Mullendore
ATTORNEYS.

Oct. 30, 1956  W. F. BRAKHAGE  2,768,730
LOADING DEVICE
Filed Sept. 8, 1953  4 Sheets-Sheet 2
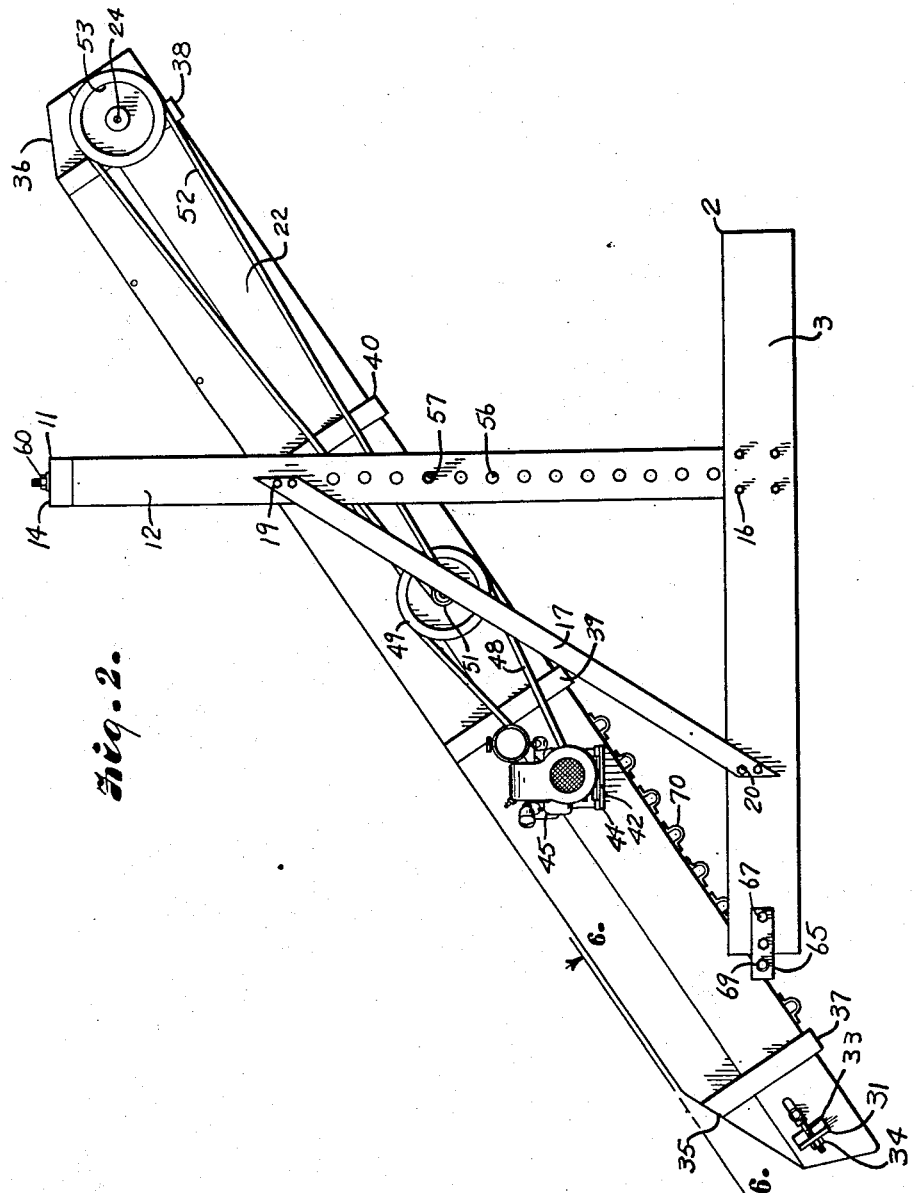
INVENTOR.
William F. Brakhage.
BY
ATTORNEYS.

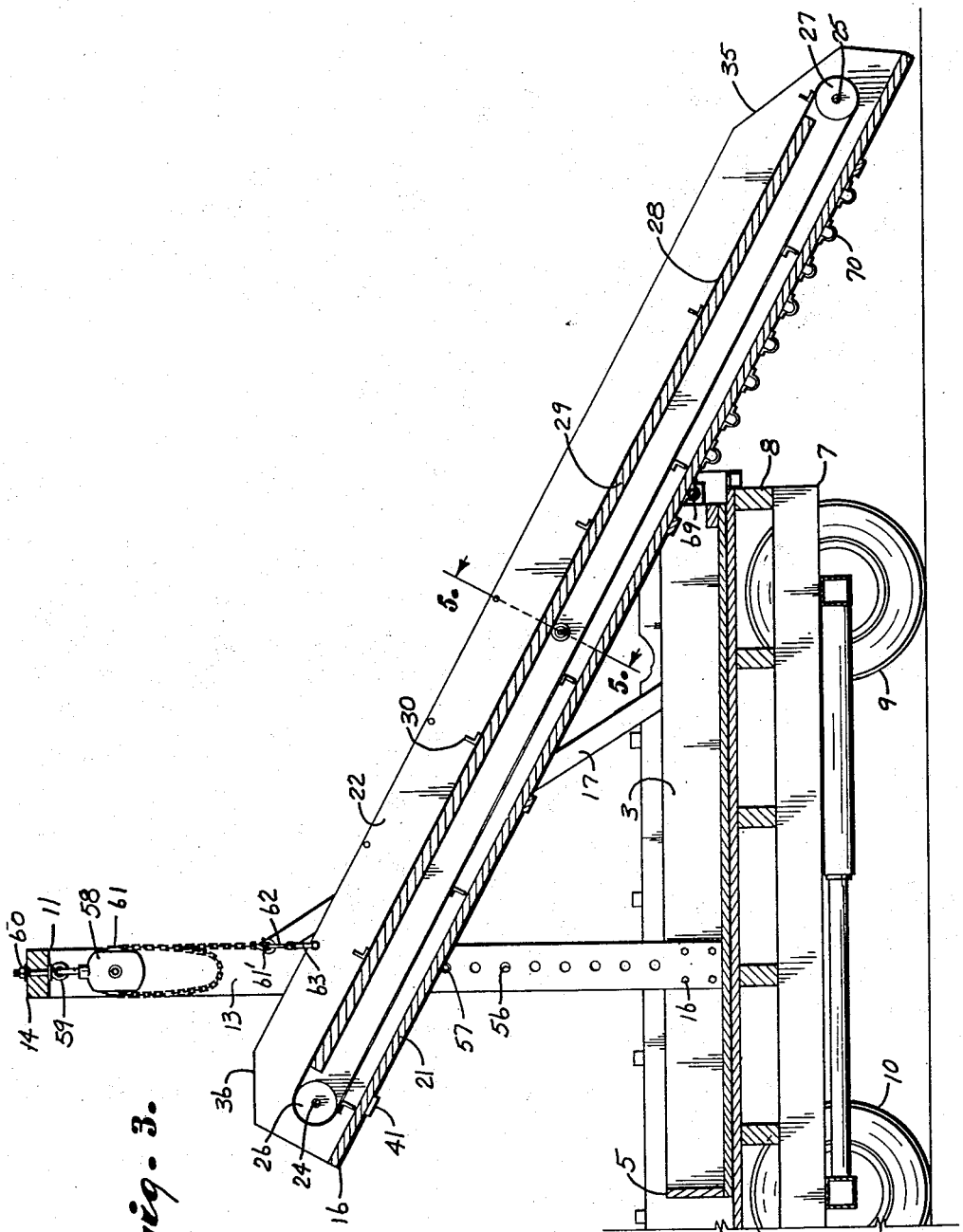

Oct. 30, 1956 W. F. BRAKHAGE 2,768,730
LOADING DEVICE
Filed Sept. 8, 1953 4 Sheets-Sheet 4
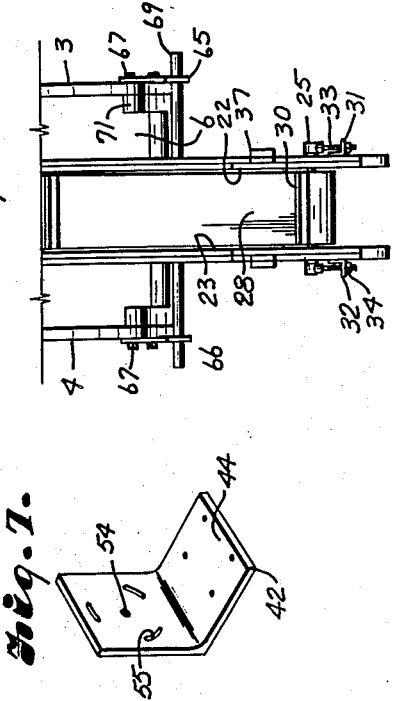
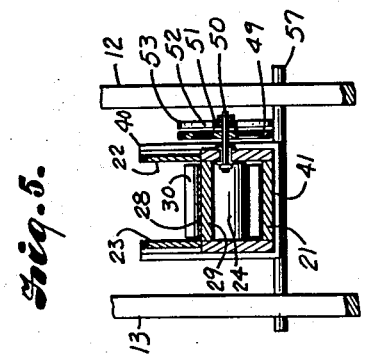
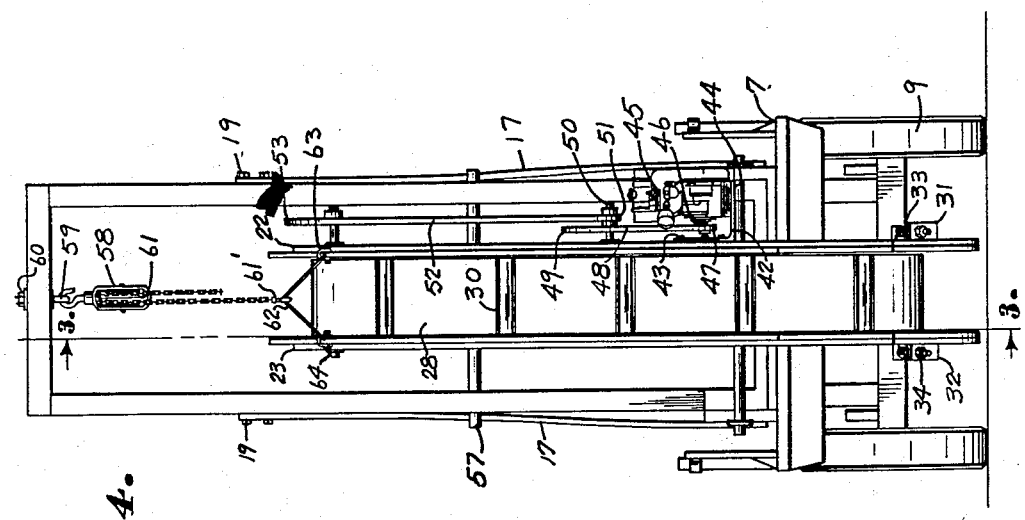
INVENTOR.
William F. Brakhage.
BY
ATTORNEYS.

United States Patent Office 2,768,730
Patented Oct. 30, 1956

2,768,730

LOADING DEVICE

William F. Brakhage, Dalhart, Tex., assignor of one-half to R. L. McMurtry, Amarillo, Tex.

Application September 8, 1953, Serial No. 378,729

1 Claim. (Cl. 198—118)

This invention relates to a loading device and more particularly to a portable device which may be transported behind a tractor or the like on a wheeled structure having elevating means for elevation of bales, bundles, shocks, grain, potatoes, fence posts and other items for depositing upon a transporting vehicle or other desired place.

The present device may be supported upon wheels attached directly to the bed thereof or it may be transported on a wheeled trailer or other vehicle and trailed behind the truck or wagon being loaded. The invention is particularly adaptable for movement over rough terrain and will operate efficiently over such rough conditions.

The principal objects of the present invention are to provide an elevator which may be wheel borne or borne upon a trailer behind a vehicle for transporting the same having means at the rear or lower end to adjust the height of the rear end with respect to the ground so as to facilitate placing of the material to be elevated in the trough of the elevator; to provide a belt operated elevator with means for operating the belt to elevate the material independently of movement of the device at desired speeds; to provide a frame for supporting the forward end of the elevator portion of the device; to provide hoist means for elevating and lowering the forward end of the elevator portion and means for holding the elevator in adjusted position; to provide means for providing tension on the belt of the elevator; and to provide a device of this character simple and economical to manufacture.

In accomplishing these and other objects of the invention hereinafter pointed out, I have provided improved structure, the preferred form of which is illustrated in the accompanying drawings, wherein:

Fig. 2 is a side elevation thereof.

Fig. 3 is a longitudinal cross-sectional view through the device mounted on a mobile unit taken on line 3—3, Fig. 4, particularly illustrating the hoisting means by which the elevator is raised and lowered to a new position.

Fig. 4 is a view taken from the rear of the device as mounted on a mobile unit.

Fig. 5 is a cross-sectional view taken on a line 5—5, Fig. 3.

Fig. 6 is a sectional view taken on a line 6—6, Fig. 2.

Fig. 7 is a perspective view of the bracket for mounting the motor on the side of the elevator.

Figure 1:
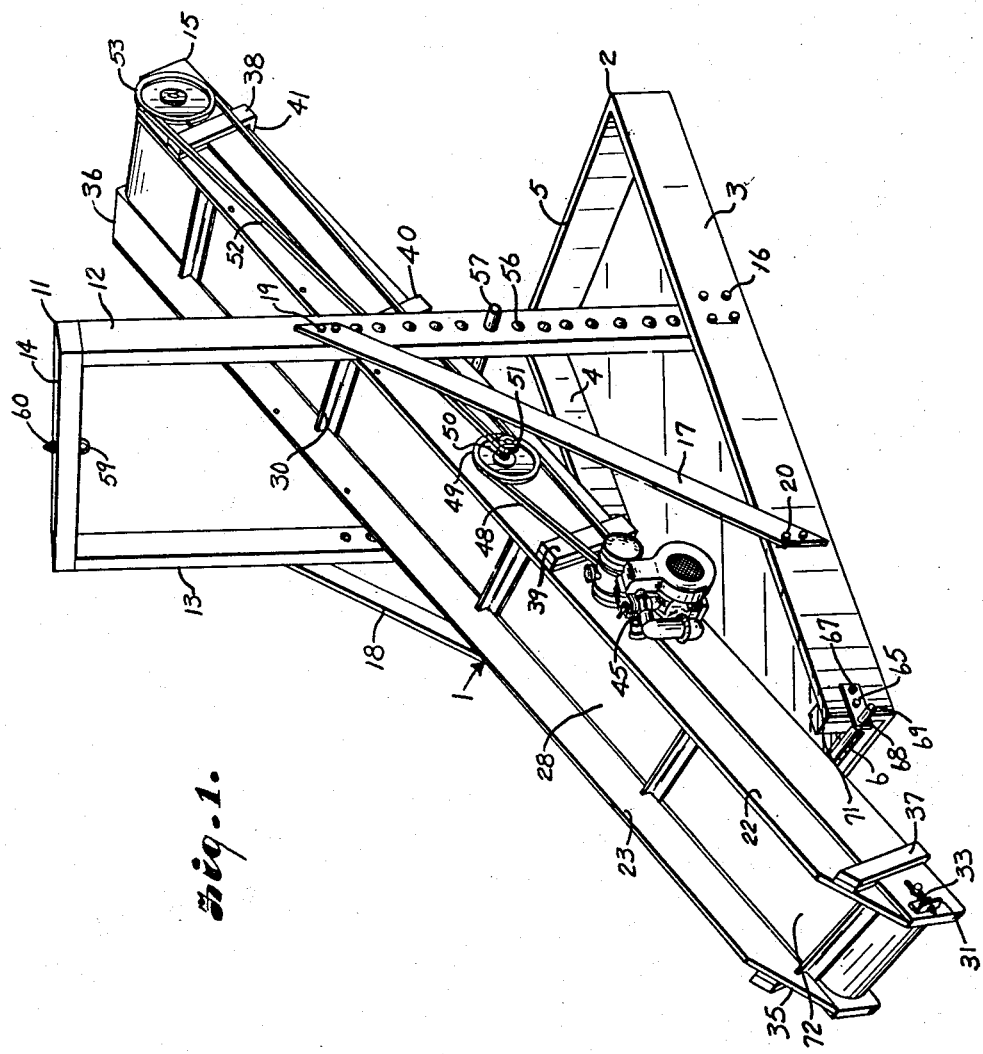
Fig. 1 is a perspective view of my invention dismounted from the trailer or other vehicle.

Referring more in detail to the drawings:

1 designates an elevating device embodying the features of my invention comprising a bed 2 having sides 3 and 4, a forward end 5 and an open rear end 6 adapted to be supported on a mobile unit or the like as indicated at 7 having a platform or body 8 supported by wheels 9 and 10. The bed 2 may be secured to the platform of the trailer by any suitable means as desired.

A gantry comprising a U-shaped frame or arch 11 having posts 12 and 13 and a cross head 14 is provided for supporting the trough or elevator member 15 between said posts. The lower ends of the posts 13 and 14 are secured to the sides 3 and 4 respectively of the bed 2 by bolts or the like 16. Braces 17 and 18 are provided having their upper ends secured to the posts 13 and 14 by bolts or the like 19 and their lower ends to the sides 3 and 4 of the bed 2 also by bolts or the like as indicated at 20.

The trough or elevating member 15 consists of a bottom 21 and sides 22 and 23 of substantially greater length than the bed 2 and extends between the standards 12 and 13. Rotatably mounted at the respective ends of the elevator member on shafts 24 and 25 are rollers 26 and 27 over which an endless belt 28 is adapted to run. Secured to the inner sides of the side members 22 and 23 of the elevator member is a platform or supporting member 29 which terminates short of the rollers 27 and 28 for supporting the endless belt in the trough. The belt is provided with a plurality of spaced angle-shaped cleats or the like 30 to facilitate movement of the articles in the hopper as is the usual practice. Tension of the belt 28 is maintained by brackets 31 and 32 on the outside of the lower end of the trough having bolts 33 engaging the shaft 25 of the roller 27 and secured to the brackets 31 and 32 by nuts or the like 34. The respective ends of the sides of the trough may be cut away as indicated at 35 and 36 and supporting cleats 37 and 38 are provided at the respective ends on the outside of the sides of the trough to lend rigidity to the structure. Additional cleats 39 and 40 may be provided in addition to the end cleats and the cleats extended underneath the bed of the trough as best illustrated at 41, Fig. 3.

An angle-shaped bracket 42 is secured to the side 22 of the trough or elevating member 15 by bolts or the like 43 and has an outstanding arm 44. A motor 45 is attached to the arm 44 of the bracket at slightly nearer the lower end of the trough and is provided with a shaft 46 having a pulley 47 adapted to accommodate a belt 48 engaging a pulley 49 supported by a stub shaft 50 also carried by the side 22 of the trough. Also mounted on the shaft 50 is a pulley 51 accommodating a belt 52 engaging a roller 53 mounted on the end of the shaft 24 which extends outwardly from the upper end of the hopper and supports the roller 26 for movement of the belt 28 in the hopper to elevate the material therein. The bracket 42 has an opening 54 which is in axial alignment with shaft 46. Slots or the like 55 are spaced around the opening 54 so that bolts 43 may be loosened and the bracket 42 may be rotated to keep the motor in a relatively level position at all times. The speed of the belt is regulated by speed of the motor.

The posts 12 and 13 are provided with a plurality of openings 56 which accommodate a rod 57 for supporting the forward end of the trough 15 in any desired position. The trough 15 may be elevated by a hoist indicated at 58 secured to an eye 59 of a bolt 60 carried by the header 14. The hoist is provided with the usual pulleys as indicated at 61 and chain having a hook 61' engaging a cable or the like 62 having its respective end secured to U-type fasteners 63 and 64 which in turn are secured to the respective sides 22 and 23 of the trough near the upper end as best illustrated in Figs. 3 and 4.

The rear end of the bed 2 is open as indicated at 6 (Fig. 1) and arms 65 and 66 are secured to the respective sides 3 and 4 of the bed by bolts or the like 67, the arms 65 extending outwardly toward the rear of the bed and provided with openings 68 to accommodate a shaft 69. The bottom of the trough 16 is provided near the lower end and the outer edge thereof on the respective sides with a plurality of brackets or spaced bearing members 70 adapted to receive the rod 69 so as to secure the trough to the rear end of the bed 2 in any desired position.

Posts or the like 71 may be provided at the rear ends of the sides 3 and 4 of the bed 2 to lend rigidity to the structure if desired.

Operation of a device constructed and assembled as described is as follows:

The device when placed upon the mobile unit 7 may then be adjusted vertically at the forward end by operation of the hoist 58 and insertion of the shaft 57 in the desired openings 56 in the posts 12 and 13, and may be moved forwardly or rearwardly of the body 2 by insertion of the rod 69 in the proper bracket or bearing 70 on the bottom of the trough to adjust the rear end of the device with respect to the ground and taking into consideration the height of the mobile unit and the material being elevated. When the device is being transported over the ground behind a tractor or other vehicle for loading of the bales, bundles or the like, the same are placed in the lower end of the trough as indicated at 72 and operation of the motor 45 will cause movement of the belt 28 in the trough member carrying the same up the elevator and depositing the same in a truck, wagon or other place of deposit.

It will be obvious that operation of the motor 45 is independently of transportation of the device and the speed of the motor may be regulated to deposit the material at the desired place, i. e. if the belt is travelling at a high rate of speed the material will be thrown out a substantial distance from the upper end of the elevator and a slower speed will tend to cause the material to drop down substantially immediately after it leaves the end thereof.

While I have shown the device to be made of wood it will be obvious that it may be made from other materials, such as metal or the like.

It will be obvious from the foregoing that I have provided an improved elevator mechanism which is portable on a mobile unit and which may be adjusted in height at the forward end and at the rearward end to accommodate loading of the material in the trough as desired.

What I claim and desire to secure by Letters Patent is:

In a device for elevating bales, bundles, or the like mounted upon a wheeled vehicle including, a bed having sides and an open rear end, a U-shaped frame rigidly secured to said bed at a point spaced from the front end thereof and extending upwardly therefrom, said frame including side posts and a cross head, brace means between the bed and said frame, an elongated trough extending through said U-shaped frame above said bed, said posts having a plurality of spaced openings therein, a rod engageable in said openings for supporting said trough in the frame and for adjusting the height of the forward end of said trough, said trough having a bottom and sides thereon, shafts mounted in the respective ends of said trough, rollers rigidly mounted on said shafts, a platform secured to the inside of the respective sides of said trough substantially midway of the width of said sides and terminating short of said rollers, an endless belt carried by said rollers, said platform forming a support for the upward flight of said belt and said bottom, a support for the return of said belt, a bracket rotatably mounted on the outside of one side of said trough, a motor carried by said bracket, the shaft in the upper end of said trough extending outwardly from one side thereof, a pulley mounted on the end of said shaft, a shaft mounted on the side of said trough between said motor and said pulley, a pulley mounted on said last named shaft, a belt connecting said motor and said last named pulley, a pulley on said last named shaft of smaller diameter than said last named pulley, a belt connecting said smaller pulley to the pulley on said roller shaft at the forward end of said trough whereby said belt may be rotated in said trough for elevating said bales, bundles or the like, hoist means carried by said cross head and having connection with the forward end of said trough for raising and lowering the forward end of said trough, arms having openings extending outwardly from the outsides of the rear end of said bed, spaced brackets forming bearings secured to the bottom near the side edges of the trough and near the rear end thereof, and a shaft engageable in said openings in the arms and in said bearings for adjustably securing said trough to said bed so that when the forward end of the trough is raised or lowered the rear end may be adjusted to remain near the ground by shifting of the trough forwardly or backwardly through change of the shaft in said bracket bearings and the shaft will rotate to provide easy movement of the trough thereover when the adjustment as to height is being made.

References Cited in the file of this patent

UNITED STATES PATENTS

| | | |
|---|---|---|
| 884,753 | Niebuhr | Apr. 14, 1908 |
| 1,213,971 | Swarner | Jan. 30, 1917 |
| 1,784,872 | Hartman | Dec. 16, 1930 |
| 2,661,105 | Purdy | Dec. 1, 1953 |